US012200467B2

(12) United States Patent
Schaefer

(10) Patent No.: US 12,200,467 B2
(45) Date of Patent: *Jan. 14, 2025

(54) SYSTEM AND METHOD FOR IMPROVED PROCESSING OF STEREO OR BINAURAL AUDIO

(71) Applicant: Philip Raymond Schaefer, Weaverville, NC (US)

(72) Inventor: Philip Raymond Schaefer, Weaverville, NC (US)

(73) Assignee: Vortant Technologies, LLC, Weaverville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,441

(22) Filed: Jan. 26, 2024

(65) Prior Publication Data

US 2024/0171929 A1 May 23, 2024

Related U.S. Application Data

(63) Continuation of application No. 18/099,950, filed on Jan. 22, 2023, now Pat. No. 11,917,394, which is a continuation of application No. 17/336,583, filed on Jun. 2, 2021, now Pat. No. 11,589,181, which is a continuation-in-part of application No. 16/238,574, filed on Jan. 3, 2019, now Pat. No. 11,032,660, which (Continued)

(51) Int. Cl.

| | |
|---|---|
| ***H04R 3/04*** | (2006.01) |
| ***H04S 3/00*** | (2006.01) |
| ***H04S 7/00*** | (2006.01) |
| *H04S 1/00* | (2006.01) |

(52) U.S. Cl.

CPC ............... *H04S 7/303* (2013.01); *H04R 3/04* (2013.01); *H04S 3/004* (2013.01); *H04S 3/008* (2013.01); *H04S 1/005* (2013.01); *H04S 7/304* (2013.01); *H04S 2400/01* (2013.01); *H04S 2400/11* (2013.01); *H04S 2400/15* (2013.01); *H04S 2420/01* (2013.01)

(58) Field of Classification Search

CPC .......... H04S 7/303; H04S 3/004; H04S 3/008; H04S 1/005; H04S 7/304; H04S 2400/01; H04S 2400/11; H04S 2400/15; H04S 2420/01; H04S 1/00; H04R 3/04

USPC ........................................................... 381/18

See application file for complete search history.

(56) References Cited

U.S. PATENT DOCUMENTS 4,968,154 A * 11/1990 Baeg ......................... H04S 5/02 381/18

2013/0216047 A1 * 8/2013 Kuech ..................... G10L 21/02 381/26

(Continued)

*Primary Examiner* — Carolyn R Edwards
*Assistant Examiner* — Friedrich Fahnert

(57) ABSTRACT

A system for rotating sound or selective listening to sound provides for the ability of the apparent direction of sound sources in a listening environment to remain in consistent orientations in space despite rotations of the microphones used to capture the sound and despite rotations of the head of the listener, even when wearing headphones. Modules are provided in the system to distinguish the sound sources and their apparent directions, as well as to optionally rotate the sound sources in response to detected rotations of the listener's head and/or detected rotations of the microphones.

20 Claims, 10 Drawing Sheets

Related U.S. Application Data is a continuation of application No. 15/613,621, filed on Jun. 5, 2017, now Pat. No. 10,251,012.

(60) Provisional application No. 62/392,731, filed on Jun. 7, 2016.

(56) References Cited

U.S. PATENT DOCUMENTS

2013/0272539 A1* 10/2013 Kim ...................... G01S 15/876 381/92
2014/0348342 A1* 11/2014 Laaksonen ............ H04R 3/005 381/92

* cited by examiner

SYSTEM AND METHOD FOR IMPROVED PROCESSING OF STEREO OR BINAURAL AUDIO

CROSS-REFERENCE TO RELATED APPLICATIONS

This is a continuation and claims the benefit of U.S. application Ser. No. 18/099,950, which is a continuation of and claims the benefit of U.S. application Ser. No. 17/336,583, now U.S. Pat. No. 11,589,181, which is a continuation in part of and claims the benefit of U.S. application Ser. No. 16/238,574, filed Jan. 3, 2019, now U.S. Pat. No. 11,032,660, which is a continuation of and claims the benefit of U.S. application Ser. No. 15/613,621, filed Jun. 5, 2017, now U.S. Pat. No. 10,251,012, which claims the benefit of U.S. Provisional Application No. 62/392,731, filed Jun. 7, 2016.

FIELD OF INVENTION

This invention relates generally to providing two-channel audio signals to a listener that closely correspond to the sounds that arrive at the ears in the vicinity of the original sound's origins and more particularly, to a device that can rotate the apparent direction of such sounds relative to the user's head, so that as the user's head moves, the sound appears to continue coming from the appropriate direction in space.

BACKGROUND OF THE INVENTION

For many years, people have made binaural recordings because of the realism that is possible. Using microphones placed in simulated or real human ears, such recordings capture many of the nuances of what gives people the ability to detect the direction of sound. So when listening to such music through headphones, the same cues are received, which lends to a realistic experience.

Binaural sound seems well-suited for virtual reality (VR) or augmented reality (AR) because it is similar to the way the visual portion of such systems work—a video scene is placed in front of the eyes to replace or enhance the real world visual scene with the virtual world scene. Similarly, placing headphones on the ears allow the virtual sound that corresponds to the virtual visual scene.

Video games and other techniques exist for generating synthetic virtual environments. Given the objects in the virtual world, as the wearer of the VR viewer moves her head, head-tracking technology sends information to the computer and then graphics routines can render the virtual visual environment for display in front of the eyes. Similarly, techniques for generating binaural or stereo sound can cause the sound to be generated from the apparent direction between the user's head orientation and each of the sound sources. As the user rotates her head, the relative direction of the various visual and sound sources will change, possibly in different ways. For example, objects to the left will tend to move around the back, and thus right-ward as the user rotates her head to the right, whereas objects in front of the viewer in virtual reality will move toward the left.

The problem is somewhat more involved for creating virtual reality audio of real-world scenes, because there is no a priori knowledge of where all the sound sources and objects are.

People involved in the art have developed methods for obtaining the visual scene from wide-angle stereo-optic cameras that capture a wide angle, for example 180 degrees or 360 degrees around the eyes, of a visual field. Then head-tracking technology wearable by the viewer can select the portion of the imagery from the entire field that corresponds to what is viewable in that direction, moving that imagery to the center of the field of view.

Audio recording technology such as above can be used to record the binaural, virtual-reality sound environment. However, current inventions intended for this purpose do poorly when the user turns his or her head, because there is not a good way to rotate the virtual sound sources in response to head motions in a similar fashion, since the sounds from the various sound sources are all mixed together in the sound stream.

Previous inventions have created ways to create sonic environments that appear to correctly maintain direction of origin of sounds, but they typically, require several microphones and/or several channels of audio so that the sounds can be appropriately recombined, or in the cases where only two channels of transmission are required, the channels are not the same as standard stereophonic or binaural recordings. For example, U.S. Pat. No. 3,997,725 to Gerzon discloses a multidirection sound reproduction system that uses separate omnidirectional and azimuthal signals to create a surround sound effect with arrays of speakers. U.S. Pat. No. 4,086,433 to Gerzon provides various enhancements for irregular arrays of speakers. U.S. Pat. No. 5,594,800 to Gerzon describes a matrix converter approach. U.S. Pat. No. 5,757,927 to Gerzon similarly describes a surround-sound approach using what is called therein "B-Format" signals or W,X,Y. To achieve a similar function, but with fixed speakers surrounding the user. While providing realistic 3D surround sound, these approaches do not directly address the case of a person wearing headphones, in which case the audio would need to change according to head direction. In "3D Binaural Sound Reproduction using a Virtual Ambisonic Approach" by Noisternig, et. al, VECIMS 2003 Conference in Lugano, Switzerland, an approach is presented that rotates the sound in accordance with rotation of the user's head. However, this approach also uses multiple channels of encoded audio, which are combined according to the output of a head-tracking unit. U.S. Pat. No. 6,144,747 to Scofield, et. al. discloses an encoding scheme that takes a 4-channel (quadraphonic) signal and combines the four channels into a binaural-like, two channel signal, so that the sound experienced by the user with nearby left and right speakers seems to arrive like the 4-channel signal would arrive from four loudspeakers. This is a similar surround-sound idea, but does not appear to address the issue of wearing headphones and rotating the head, as well as assumes surround-sound encoding of the audio. In contrast to such approaches, it is preferable for many applications to be able to use existing two-channel recording technology such as is used for binaural and stereophonic audio, rather than prior art multi-channel encoding technology. Using standard two-channel inputs makes it possible to create surround-sound rotation effects from recordings that are recorded and distributed using standard, commonly-available two-channel techniques. It is also preferable for many approaches for the user to wear standard headphones for hearing the sound.

Yet another approach that could be used for surround sound is beam-forming. A series of audio beam-formers, such as are used for surveillance devices or hearing aids, could be used to obtain a signal from each of several directions. Each signal could then be rotated to appear to come from a corrected direction. However, this approach would have the advantage that the left and right portions of the signal for each beam are irreversibly combined, so that any nuances about the left and right signals coming to the ear from that source are not present in the output signal.

OBJECTS AND ADVANTAGES OF THE PRESENT INVENTION

Therefore, several objects and advantages of the present advantage are:

To accept real-world recordings or live streams of dual-channel sound and rotate the sound, so that the various sound sources appear to rotate relative the user's head.

To rotate the sound in a manner such that, to the extent possible, the unique characteristics of the channels of sound are maintained.

For virtual reality of pre-recorded binaural scenes, to cause the sounds to rotate appropriate while a VR viewer is rotated during playback. This will be possible using as few as only two video images corresponding to the total visual field, plus two sound channels corresponding to the two ears.

For binaural recording without the video imagery, as a way to add further realism to playback of music and other recordings, so that a more realistic sonic environment is available with headphones.

For non-binaural, stereo recordings, to give more realism. Even if the exact cues are not available, the sound will appear to rotate as a function of head rotation, still giving more realism than without this effect.

For synthesized music of multiple channels. To produce an effect of the music rotating as the user's head rotates as an enjoyable and enriching experience for the user, possibly helping reduce the "closed-in" feeling often had after listening to headphones for extended periods of time.

For watching movies, even if the video is not VR, to have the sound correspond to the user's head orientation will allow headphones to be used more effectively for movie watching.

For listening in noisy environments, to spatially filter binaural or stereo sound for focusing on sounds from particular directions.

SUMMARY OF THE INVENTION

The subject invention is a system that accepts a standard binaural or stereo audio signal and separates the two-channel signal into a series of signals, each which appears to be originating from a separate direction in space relative to the placement of microphones that captured the sound. The invention then accepts another input indicating the orientation of the listener's head. Each of the series of signals is then moved so as to arrive from a corrected angle that is a function of the user's head orientation. The rotated series of signals is then re-combined into right and left signals such that the direction of the signals is modified to take into account any changes in the listener's head orientation.

In another embodiment of the invention, the orientation of the microphones is measured and the two-channel signals from the microphones are similarly broken down into a series of signals coming from different directions, then rotated and recombined so as to give the effect that the orientation of the microphones does not change.

In another embodiment of the invention, the signals coming from the microphones or listened-to by the listener are rotated to give special effects that do not necessarily correspond to any rotation of the listener or of the microphones.

In yet another embodiment of the invention the signals coming from the microphones are spatially filtered to focus on particular directions.

DESCRIPTION OF THE PREFERRED EMBODIMENTS

Figure 1:
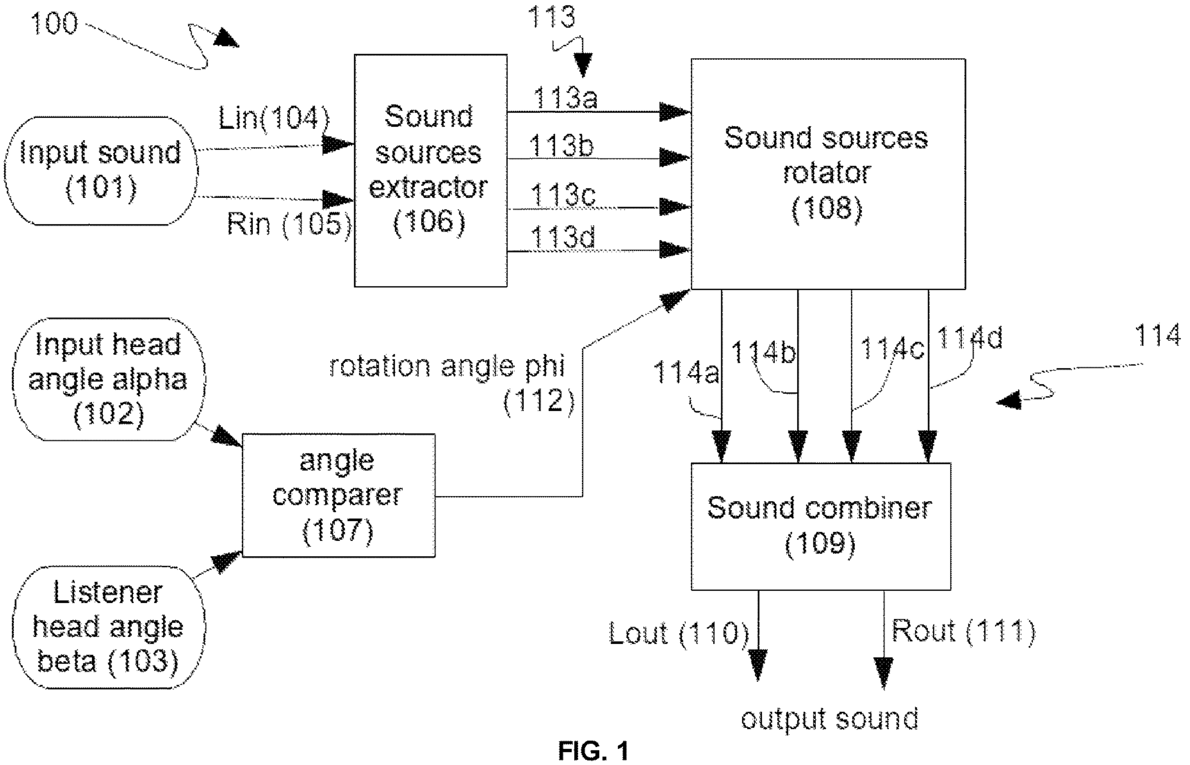
FIG. 1 is a block diagram of a preferred embodiment of a sound rotation system according to the present invention.

FIG. 1 shows a high-level view of a preferred embodiment of a sound rotation system 100. Input sound 101 comes from a device, file, or other source that provides a multiple-channel, preferably two-channel, stereo or binaural sound. This is interchangeably referred to as the input sound, input sound signal, or input signal in the following paragraphs. FIG. 1 depicts two channels of input sound, a left channel Lin 104 and a right channel Rin 105. (It should be noted that the techniques described here could be applied to multiple-channel sound sources of more than two channels, as will be apparent to those with skill in the art).

It will be apparent to those with skill in the art that the modules 106, 108, 107, and 109, as well as the modules in FIGS. 4, 5, 9, and 10, can be implemented in various forms, such as with analog circuitry, digital circuitry, microcontroller hardware and firmware, or software applications installable on and/or hosted on a computer, tablet, smartphone, smart watch, or other device with computing capabilities.

A sound sources extractor 106 processes the input sound 101 to create a set of sound source signals 113, consisting of individual sound source signal 113*a*, sound source signal 113*b*, sound source signal 113*c*, and sound source signal 113*d*. For convenience, only four sound source signals are shown in FIG. 1, but as described below, there could be many more than four sound source signals within sound source signals 113. Each sound source signal represents an extracted portion of the input sound 101 associated with an apparent direction from which it is arriving relative to the head/microphone orientation of the recording microphones or input recording head, if the microphones are mounted to a real or simulated head as is standard practice in binaural audio. In the preferred embodiment of the invention, each of the sound source signals 113 is a two-channel signal, although monaural or multi-channel embodiments of the invention are possible. If input sound 101 is not binaural sound, the associated apparent direction for each sound source signal in sound source signals 113 is relative to the default or center orientation of the apparent audio field of the stereophonic material.

Optionally, an input head angle alpha 102 corresponding to the input sound is also provided along with the input sound. Input head angle alpha 102 could conceivably vary with time, for example, if a portable recording device is used with the microphone operator wearing binaural recording earbuds. If input head angle alpha 102 it is not available, a default of 0 degrees can be assumed, assuming that the audio sound is produced relative to a reference angle of the head. Other default angles could be used to take into account different microphone angles relative to the sound sources of interest. An angle comparer 107 compares the input head head angle alpha 102, if available, to the listener head angle beta 103. Listener head angle beta 103 is measured by a device such as a head tracker, or could be independently derived from some other sensor system.

The reference listener head angle, which is the angle at which listener head angle beta 103 equals zero in the preferred embodiment, may be determined differently in various embodiments of the present invention. In a preferred embodiment, the reference head angle is set to the point at which a listening session begins, such that the virtual sonic environment experienced by the user will be defined as an arbitrary starting direction. In alternate embodiments, the reference head angle may depend on an absolute angle with respect to the earth's surface, if it is relevant to the use of the invention. As discussed later, the reference head angle may also vary with time.

The output of angle comparer 107 is the rotation angle phi 112, indicative of the angle by which the input sound 101 needs to be rotated relative to the listener's head, based on the degree to which listener head angle beta 103 is different from the input head angle alpha 102. Rotation angle phi 112 is also referred to simply as "phi" later in this specification.

If angle comparer 107 is not present, rotation angle phi 112 is alternately supplied by another method, for example, a manual hardware of software input under control of the listener, or under control of another automatic module, or superimposed with input sound 101.

As an example, consider the case where a fixed binaural microphone head is used to make a recording. And assume that a head tracker is used with the playback of the sound. The initial position of the head tracker when starting the playback is preferably used as the reference listener head angle as described above. Then, during playback, as the listener's head moves, the negative of the difference between the listener head angle beta 103 and the zero reference point is used to calculate rotation angle phi 112. For example, if the user turns her head to the left by 30 degrees, the rotation angle phi 112 would be indicative of rotating the sound to the right by 30 degrees to keep the apparent source of the sounds in the same relative to the virtual environment of the listener.

Figure 2:
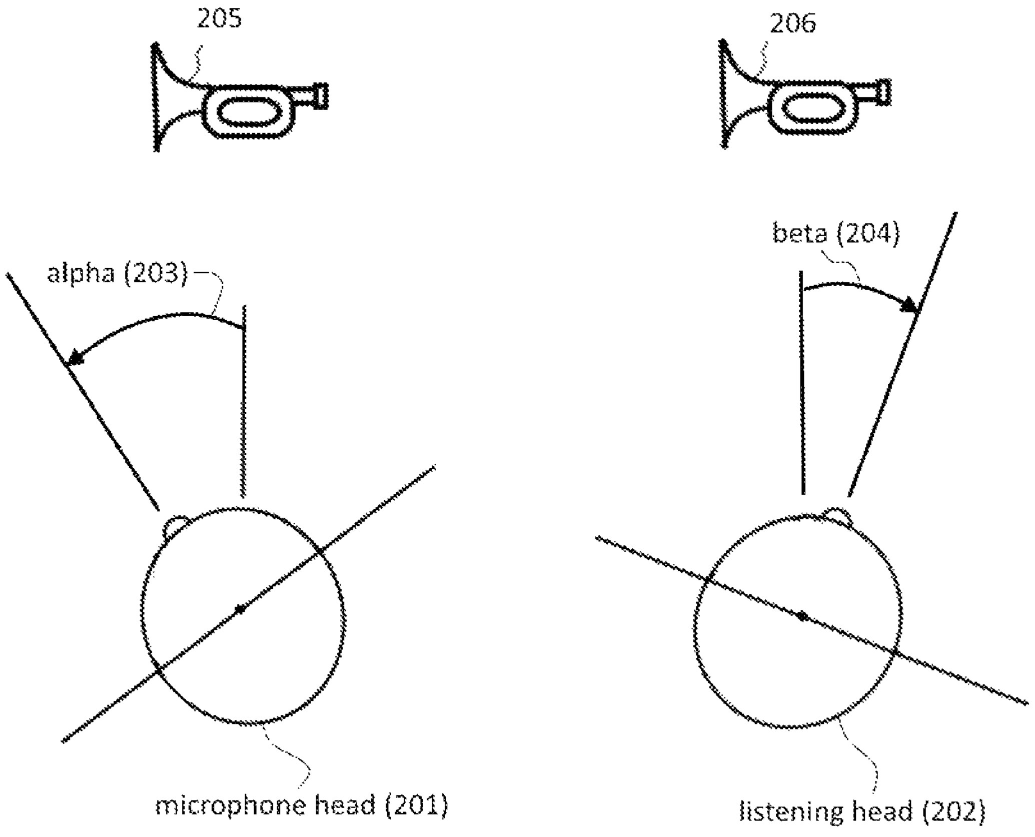
FIG. 2 is a depiction of an embodiment of how the head angle associated with microphones that pick up sound and the head angle associated with the listener are used to maintain the apparent direction of a sound source.

As a further example, FIG. 2 is a depiction of how the input head angle alpha 102 (equivalently, alpha 203 of microphone head 201 in FIG. 2) and the listener head angle beta 103 (equivalently, beta 204 of listening head 202 in FIG. 2) are used to maintain a consistent apparent direction of a sound from sound source 205, irrespective of the rotation of microphone head 201 and listening head 202. Microphone head 201 corresponds to a person's head or a synthetic binaural microphone head. Listening head 202 corresponds to a person's head who is listening to the output sound signal from the present invention, for example, wearing headphones. Initially, assume that microphone head 201 and listening head 202 are both aimed forward, in other words, toward the top of FIG. 2, and that this represents the reference listener head angle. Similarly, this represents the reference input head angle, which is similarly used in angle comparer 107. In the case discussed here, a simple binaural recording or streaming system as in the art would produce an apparent angle of virtual sound source 206 as perceived by listening head 202, that is the same and consistent with the apparent angle of sound source 205 as perceived by microphone head 201, namely appearing to be straight ahead in the room. Now assume that microphone head 201 is rotated to the left by an angle alpha 203 and listening head 202 is rotated to the right by an angle beta 204, as shown. With a standard binaural system in the art, at this point, the apparent angle of sound source 205 and virtual sound source 206 relative to the head would be the same for both microphone head 201 and listening head 202, so that for listening head 202, the apparent sound source 206 would appear to have moved in the environment and be arriving from a different angle, with respect to the environment, of beta 204-alpha 203 counter-clockwise, rather than staying stationary. Therefore, to produce an accurate reproduction of the environment for listening head 202 irrespective of the rotation angles of microphone head 201 and listening head 202, the apparent sound source 206 must be rotated oppositely, namely, by an angle of alpha 203-beta 204 counter-clockwise. Thus, the rotation angle phi 112 for the preferred embodiment of the present invention for this example, would equal alpha 203-beta 204, assuming that counter-clockwise is positive.

The simplest case, as depicted in the embodiment described above, would have rotation angle phi 112 defined only in the yaw direction, in which heading is measured. However, roll and pitch could also be used for a more fully-immersive playback experience, as is discussed later below, by utilizing vectors of angles instead of scale angles in the same fundamental methodology as in the embodiment above.

Sound sources rotator 108 takes the bank/set of sound source signals 113 and applies a sound-rotation transformation operation to each, to rotate each of the sound source signals 113 according to rotation angle phi 112, thus outputting rotated sound signals 114. In FIG. 1, rotated sound signals 114 consists of rotated sound signal 114*a*, rotated sound signal 114*b*, rotated sound signal 114*c*, and rotated sound signal 114*d*, although rotated sound signals 114 may consist of many more than four individual rotated sound signals. In the preferred embodiment, each rotated sound signal corresponds to one source signal. This rotation is implemented in the preferred embodiment by generating a two-channel rotated sound signal in 114 for each of the sound sources 113 such that the apparent angle of sound source i equals the original apparent angle theta of channel i, (also herein called theta.i) relative to the input head angle alpha 102, plus the rotation angle phi 112. For example, in FIG. 1, rotated sound source signal 114*a* has an apparent source direction that is equal to the apparent source direction of sound source signal 113*a* plus rotation angle phi 112. The output of sound sources rotator 108 is thus in the preferred embodiment a series of two-channel sound source signals that are each coming from the desired apparent direction in space.

Sound combiner 109 takes the rotated sound signals 114 from sound sources rotator 108 and combines them into an output sound signal with left channel output Lout 110 and right channel output Rout 111. Sound combiner 109 can simply implement an addition of the various rotated sound signals 114, for example, by summing together all the left channel signals from rotated sound signals 114 into Lout 110, and all the right channel signals from rotated sound signals 114 into Rout 111, along with scaling to make sure the output level is compatible with the playback equipment, or can be more sophisticated, as is discussed below.

If more than the horizontal yaw plane is used in these rotations, one or more angles among input head angle alpha 102, listener head angle beta 103, theta.i and rotation angle phi 112 become vectors representing a composite rotation of roll, pitch, and/or yaw, or any combination of one or more of these angles.

Sound Sources Extractor

Sound sources extractor 106 is a central key to the present invention. Its task is to separate out apparent sound sources in the input sound 101 and calculate an apparent angle for each, in other words, the apparent direction from which each is arriving, so that each source can then be correctly rotated. Note that when this discussion speaks of a "source", it is not necessarily a one-to-one correspondence with a physical sound-producing object, although it can be. A "source" could alternately correspond to several physical objects, or part of the sound coming from a physical object.

One way to perform the task of sound sources extractor 106 would be to implement a series of bandpass filters that are expected to correspond to the spectral extents of various sound sources and calculate the apparent angle of the output of each filter. This approach would work fine if the various sources in the sonic environment had predominantly non-overlapping spectra. However, in frequency ranges where the spectrum overlaps significantly, the apparent angles would be mixed. The audio distortion would be relatively minimal, however, because the output could be the weighted outputs of the bandpass filters, so most of the original phase information would be retained in the output.

Taking this idea further would be to perform a complete spectral analysis into many smaller frequency bands, perhaps going so far as to compute a Fourier or Laplace transform, or other frequency-extraction scheme, and treat each frequency band as a separate sound source, computing its apparent angle for rotating it appropriately. This alternate embodiment still has a similar issue in that sound sources that have overlapping spectra would tend to be added to come from the net angle. For example, if there were a voice on the left side and a trumpet on the right side, for those frequencies where the two coincide, there would be one signal from the front and none from the two sides for that frequency, so parts of the spectrum would be missing from the left and right. Additionally, even if reconstructed properly, the sound sources rotator would not be able to properly modify the sounds to account for the way that sound waveforms are modified as a function from the direction in which they arrive, since the average arrival angle at each frequency would in effect be used.

A preferred embodiment of the present invention uses an approach by which each filter corresponding to a source can extract information from a relatively wide frequency range, in such a way that the parts of a spectrum of the corresponding sound source will tend to be collected together, and thus be rotated together. To avoid interference between sound sources, not all frequencies within the overall frequency range of the filter should be included, instead only selected frequencies that are likely from the associated real-world sound source. By allowing different parts of a frequency band to be associated with different sources, this allows components of overlapping spectra to be extracted and rotated differently. To do so requires defining a series of frequencies for each filter that represent likely components of the corresponding source signal, and then gathering-together the parts of the input signal that occur in that series of frequencies.

An embodiment to accomplish this would be to have a library of the frequency spectra of a variety of known sound sources. Then the Fourier Transform could be taken and for each item in the library, the amount of energy corresponding to the frequencies in its transform be summed. For example, the average angle for the spectral components of each known source, preferably weighted by the amplitude of the spectral component, could be computed, and then the signals for all components of that sound source rotated by phi. If spectral components overlap between sources, the highest weighted one could receive all of that component's amplitude in its averaged sum, or the outputs included with each source weighted proportionally.

There is a disadvantage of this embodiment in that it requires a library of known objects, and additionally, that it can be computationally expensive to find the Fourier Transform of the signal over each piece of the sound, and the reconstruction of the waveform is very difficult, since the library might not have phase information, and if it does, would require precise generation of all the spectral lines and a need to piece them together over time.

A preferred embodiment of the present invention is to create a relatively simple filter that has similar properties as the library of functions—namely that each filter can cover signals over a wide range, but unlike a bandpass filter, doesn't consider all the frequencies in the range more or less equally. Such a filter should preferably include common patterns of frequencies that are found in real world sounds without relying on extensive libraries with all possible sound types. One useful fact about most natural (and many synthetic) sounds is that they are rich in harmonics. Since mechanical processes that cause sound involve creation of harmonic energy, a filter that has a harmonic frequency response would be ideal for the invention. A simple filter that meets these criteria is a comb filter. The comb filter is based on feeding back the input or output of a filter with a fixed time delay. The fixed time delay in the time domain leads to a periodic response in the frequency domain. So if a comb filter is constructed with the fundamental frequency of a sound in the natural world, it is likely that much of the energy from that sound will be captured in the harmonic responses of that comb filter. Additionally, the frequencies in between the response frequencies of the comb filter are not captured by the filter, so that sounds with different spectral qualities can be detected by other comb filters having different fundamental frequencies and with harmonics that are not all coincident with the filter in question. If comb filters that have fundamental frequencies that are roughly harmonics of each other, sound sources with similar fundamental frequencies, but different harmonic shapes will respond differently to different comb filters.

To cover the entire audio frequency range appropriately, a preferred embodiment is to use fundamental comb filter frequencies in a roughly geometric progression, such as in steps of 10% to 20% starting at the lowest frequency to be rotated. There are advantages to making sure some of the filters do not overlap in harmonics, so that the greatest portion of the entire audio spectrum can be accommodated. Linear, random, or other sets of fundamental frequencies could also be used in the present invention.

The preferred embodiment of the present invention therefore uses a bank of comb filters, starting with a low frequency, for example 50 Hz, and moving upward to a few thousand Hz. Each comb filter can be considered as being able to detect a simple "sound source", as it will capture many parts of the spectrum of a real-world object. And if the real-world object has a complex waveform, rather than a simple harmonic, a series of the comb filters may in fact represent the physical sound-producing object. The number of sound sources is a trade-off, but as an example, 10 to 30 comb filters could be used in a preferred embodiment of the present invention.

In the text that follows, the term "path" will be used to refer to the signals detected by sound sources extractor 106 and occurring downstream corresponding to one of the bank of comb filters. For example, if a bank of 5 comb filters is used, there will be 5 paths for signals to flow from the outputs of the sound sources extractor 106 through to the sound combiner 109. The subscript "i" will be used to denote the input or processed signal corresponding to the path i or the "ith" comb filter. For example, when discussing one path among the bank of sound sources 113, the text may refer to angle theta within the context of that path, which corresponds to theta.i in the global view of all the paths.

Instead of a basic comb filter, alternate embodiments of the invention can be created, such as by adding additional feedback loops in the comb filters at sub-intervals of the fundamental feedback interval, using both feedback and feedforward versions of the comb filter, etc. Any such modification that keeps the response of the filter roughly corresponding to elements of one or more fundamentals plus their harmonics could be utilized in embodiments of the present invention, and typically, different higher-frequency responses among the filters will help separate sound sources more, such that multiple filters with similar fundamentals but different harmonic responses could be used for example to detect different musical instruments playing the same fundamental note. One particularly useful alternate embodiment is to put a comb filter in series with a simple low-pass filter, so that the harmonics have decreasing response, similar to many real-world sounds. We will refer to the selected comb filter design or any similar variations on a comb filter with the more general term "source filter" in the discussion below. If a multiple-channel signal is used, the term "source filter" may also imply a pair of similar source filters, one for each channel.

Figure 4:
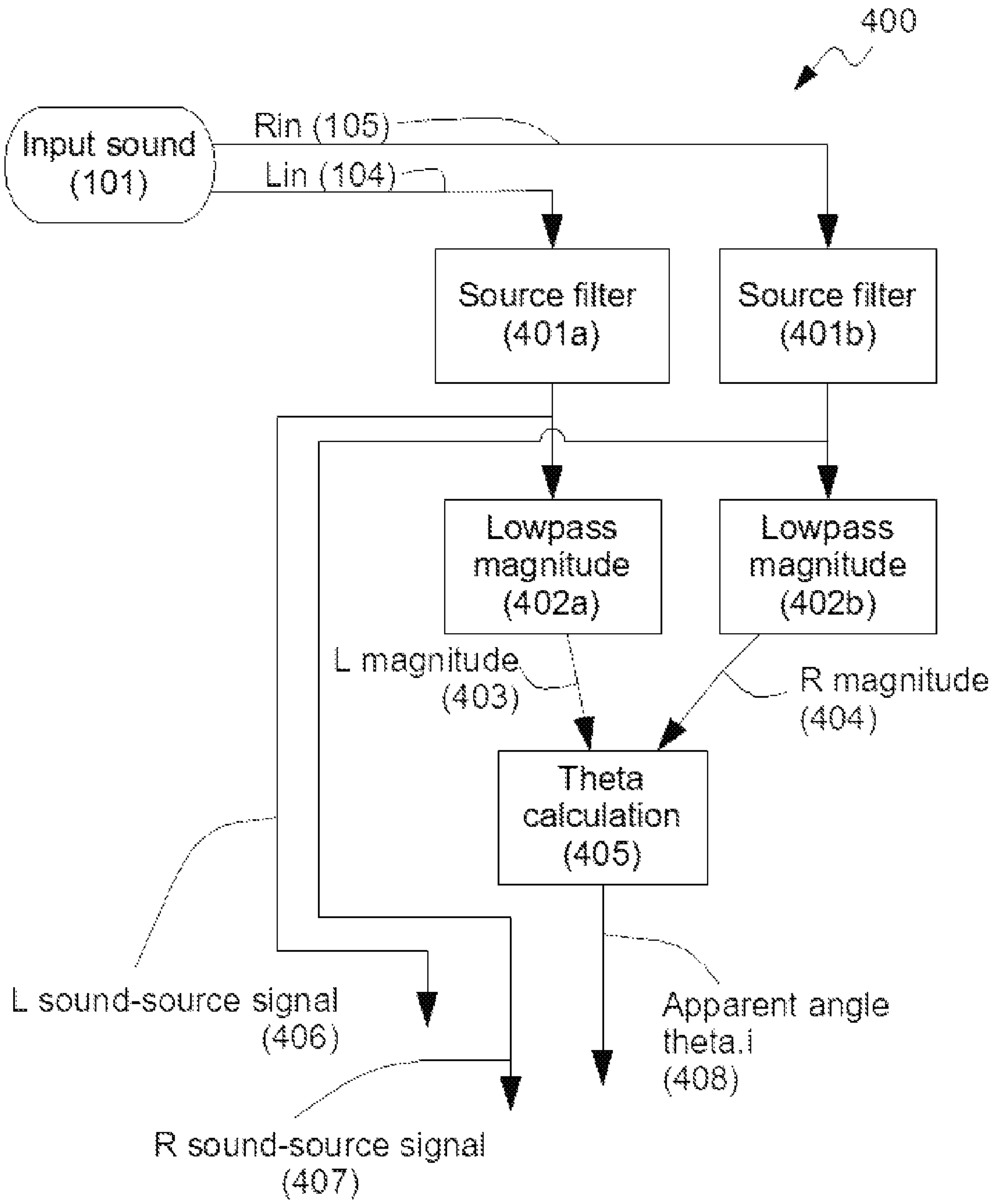
FIG. 4 is a block diagram of a sound source extractor of a sound sources extractor according to the present invention.

FIG. 4 shows a sound source extractor 400 according to a preferred embodiment of the present dimension. Sound source extractor 400 corresponds to the processing within sound sources extractor 106 that produces one of the sound source signals 113, namely one of 113*a*, 113*b*, 113*c*, or 113*d* of FIG. 1. In the preferred embodiment, sound source extractor 400 has parallel, similar filters for each channel, and correspondingly outputs filtered versions of each channel. For example, for a binaural embodiment, there will be two filters and the output will also be binaural. Thus, the L 104 input and R 105 input signals from input sound 101 go to source filters 401*a* and 401*b* respectively, which are set to the base frequency for the path and preferably have the same frequency response, after which lowpass magnitude filters 402*a* and 402*b* measure the amplitudes of the source filter 401*a* and 401*b* outputs. The outputs of source filters 401*a* and 401*b* also constitute a L sound-source signal 406 and an R sound-source signal 407. Lowpass magnitude filters 402*a* and 402*b* calculate a lowpass-filtered version of the magnitude of the outputs of source filters 401*a* and 401*b*. In the preferred embodiment of the invention, Lowpass magnitude filters 402*a* and 402*b* first find the magnitude of their respective inputs, then lowpass-filter those magnitudes to produce L magnitude 403 and R magnitude 404. An Angle Calculator, namely Theta calculation 405, computes the value of Apparent angle theta.i 408 by applying, in this example, equation 1 below, for the particular path handled by sound source extractor 400.

The energy, magnitude, or amplitude output of source filters 401*a* and 402*b* is found by one of several methods, such as one embodiment using Lowpass magnitude filters 402*a* and 402*b* as described above. Another embodiment of the present invention does this by measuring amplitude of the source filter 401*a* or 401*b* output at each sample point (e.g., at 44,100 Hz), or by putting the source filter or its output amplitude through a low-pass filter such as lowpass magnitude filters 402*a* and 402*b*, or by a peak- or envelope-detecting filter. Updating the apparent direction of the sound, Apparent angle theta.i 408, too quickly results in noise distortion because small changes in the detected direction may occur due to transient sounds, leading to some switching-like noise downstream in sound sources rotator 108, whereas too much low-pass filtering causes unsettling directional shifts as sound sources appear to move around slowly, for example, if a sound source extractor 400 suddenly becomes more representative of (matched to) a sound coming from a different direction, and the apparent angle theta.i 408 slowly moves to the new direction instead of switching immediately. Rather than a fixed filter time constant for all source filters, filtering that varies with the fundamental frequency can be used, for example, using a low-pass filter cutoff frequency proportional to the filter's fundamental frequency. In some situations, filtering of the values will tend to reduce the occurrence of larger angles of theta.i that should be present. This can optionally be accounted-for by multiplying the apparent angle theta.i 408 output by a "fudge factor", such as a value of 1.2.

In any case, a mathematical head model, in other words, a mathematical model of how the sound reaches the listener's ears is used to derive the apparent angle theta.i. For one embodiment of the model, the technique used to obtain amplitudes from source filters will provide a left and right (L and R) amplitude value for each path and source signal, namely L magnitude 403 and R magnitude 404 in FIG. 4, corresponding to the left and right source filter output amplitudes. Additionally, or alternately, the time delay between the outputs of source filters 401*a* and 401*b* (the L vs. R time delay) are determined in a preferred embodiment of the present invention. This is ideally done by a correlation of the output values of source filters 401*a* and 401*b* over a recent time period, for example, 10 to 100 ms. Based on the L and R amplitudes and/or the L vs. R time delay, the apparent angle theta.i 408 for the source filter channel 400 is determined. One simple model as depicted in the embodiment shown in FIG. 4 is to ignore the time delay and use the relationship $$\text{theta}=-pi/2+2a\tan(L\text{ magnitude}/R\text{ magnitude}) \qquad \text{(equation 1)}$$

or another similar mapping that relates that at theta=−90 degrees, the L channel will be maximum and the R channel minimum, and vice versa at +90 degrees, with approximately equal L and R values corresponding to theta=0. Of course alternate mappings of positive and negative or different angle measures, or even simply using ratios or sines and cosines can be done within the scope of the present invention. We will use the convention of Left ear at −90 degrees for the following discussion. Note that the terms "L", "Left", and "amplitude L", as well as the corresponding R terms may be used interchangeably and the context will be apparent to those with ordinary skill in the art. Although this simplification may work well for higher frequencies, lower frequency, longer-wavelength signals tend not to show a strong amplitude relationship. To accommodate this shortcoming, the time delay can optionally be computed from a version of source filters 401_a_ and 402_b_ that are high-passed at their input, for example, with a 400 Hz corner frequency, so that the calculation is effectively made only for the higher-frequency portion of the spectrum captured by source filters 401_a_ and 401_b_.

Figure 3:
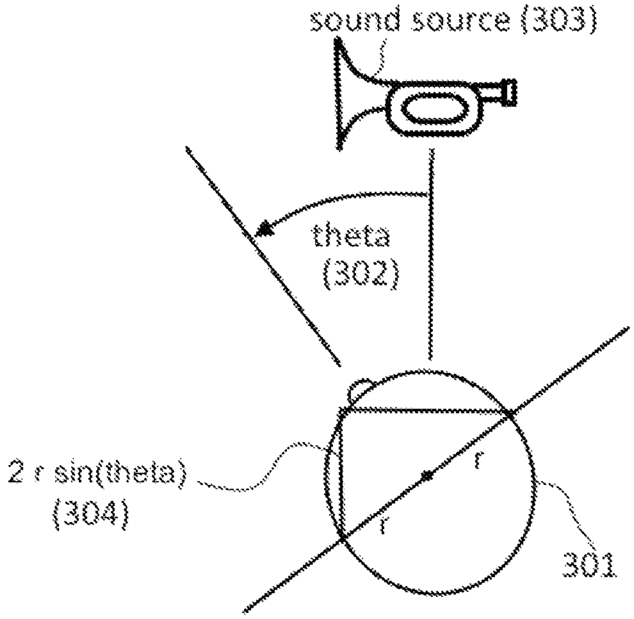
FIG. 3 is a depiction of angles and distances associated with a listener's head relative to a sound source.

The time delay between the two ears of a listener can also be used in the model to derive an apparent angle theta.i 408 of the source corresponding to source extractor channel 400. Using the speed of sound at approximately 343 meters/sec, and given the approximate radius of the head, simple trigonometry can be used to derive an approximate time delay between right ear and left ear sounds for various head pointing angles. FIG. 3 shows a diagram depicting such a simple model. The head 301 is rotated by a counter-clockwise angle theta 302 from the reference angle of zero, where sound source 303 is located, possibly at a distance much larger than to scale. Distance 304 represents the difference in distance that a plane wave of sound will travel to arrive at the left ear of head 301 as compared to the right ear of head 301. Distance 304 thus suggests that an expression for the corresponding time delay of the left channel of audio for an embodiment of the present invention is $$\text{tdelay.left}=2r\sin(\text{theta})/v.\text{sound} \qquad \text{(equation 2)}$$

where 2r is the distance between the ears of head 301, theta is the angle theta 302 with which the apparent direction of sound source 303 is rotated with respect to the listener's head, v.sound is the velocity of sound, and tdelay.left is the time delay of the L sound compared to the R sound.

The two models depicted in equation 1 and equation 2 are fused in an embodiment of the present invention to arrive at the best answer, such as by averaging, or by weighting each result according to the variances expected in the readings and calculations at the values in question.

As an alternative to the above simple equation models for amplitude and delay, the Head Related Transfer Function (HRTF) can be used to advantage as a mathematical head model. The HRTF is a function used in the art for generating synthetic sound that appears to have a given direction relative to the listener. The HRTF shows the response of the interior of the ear to sounds originating at a distance. The impulse response of the HRTF shows the response in the ear to an impulse sound at a distance. By analyzing an HRTF appropriate for the listener, the ratios of amplitudes and time delays can be computed for a more realistic head than the "ideal", simple head that doesn't affect the sound as in the head model depicted in FIG. 3 and in equations 1 and 2. In effect, the L and R amplitudes and delays can be compared to the HRTF relative amplitudes and delays for various head angles to indicate the angle that gives the best match. This could be computed at run time with an HRTF model, but in a preferred embodiment, lookup tables of various head angles, amplitudes, and time delays are precompiled by running a range of impulse response and/or sinusoidal signals through an HRTF model.

Various other engineering models known in the art can be used to arrive at more or less accurate estimates of the direction of the source within the scope of the present invention, using the outputs of the source filter, or simple modifications of the source filter such as described above.

The observant reader will note that the above simple model equations result in an ambiguity—that the relative amplitudes and time delays will be equal at two different angles—one with the user's head facing the sound and one away from the sound. A method is needed in sound source extractor 400 to make a decision about which angle to choose. One simple method in a preferred embodiment is to assume that most important events will be taking place in front of the recording head or microphone array, so always to choose the angle corresponding to the head aimed relatively toward the sound source. However, the shape of the ears causes a difference in the spectrum and impulse response for sounds coming from the front vs. rear. The HRTF concept can be used in this case. The Fourier Transform or other frequency-extraction method can be used to compare the spectra of the L and R outputs of the source filter. The difference in frequency response that best matches the differences in frequency response between the HRTFs corresponding to the front-facing and rear-facing cases would be chosen. Alternately, without having to use HRTFs explicitly, spectral differences over a wide range of experimental tests with in-ear microphones could be used to experimentally derive the differences in frequency between sounds arriving from the front and the rear. One simple embodiment of the present invention uses an algorithm determining that if the high-frequency amplitude of the output of source filter 401_a_ compared to the source filter 401_b_ is higher by a certain factor, for example 5 percent, relative to the difference in frequency amplitude over all frequencies between source filters 401_a_ and 401_b_, then the "toward the sound" direction should be chosen, since the ear facing the source tends to induce more high-frequency effects than the ear with the head partially obscuring a direct path to the source for the "toward the sound" case. In the "away from sound" case, the sound comes from the rear in both ears, so the difference in high-frequency spectrum should be less. The high-frequency content comparison between the outputs of source filters 401_a_ and 401_b_ can be found by Fourier Transforms, by one or more highpass or bandpass filters, by looking at the sum total of high-frequency energy, by looking at one or more specific frequency values, or by finding statistics over the high frequency range such as maximum difference, average difference, and variance of difference, to make the decision as to whether the high-frequency content differential between the filter outputs is of greater magnitude than a threshold value.

To output the L sound-source signal 406 and R sound-source signal 407 for a path in a sound source extractor 400, the outputs of source filters 401_a_ and 401_b_ are used. Optionally, instead of outputting the latest output of source filters 401_a_ and 401_b_, a time-delayed output from filters 401_a_ and 401_b_ can be used instead. And since comb filters have built-in delay functions, these delayed signals can be extracted from the comb filters instead of from a separate delay module. Since downstream calculations would be computing the amplitudes from a point in time later than the sound being output, it would allow the amplitudes in the theta calculation 405 to in effect consider the input sound 101 characteristics somewhat into the future, and not only the past. This option allows a more timely response of the apparent angle theta.i 408 outputs to the onset of a new sound.

The Sound Sources Rotator

Sound sources rotator 108 takes the extracted sound sources 113 from the sound sources extractor 106 and creates a new version of each sound source that appears to come from a specified direction phi with respect to the angle theta.i of the sound from each source coming from sound sources extractor 106. In other words, the result of sound sources rotator 108 is a sound for each path i that appears to come from angle phi plus theta.i.

Figure 5:
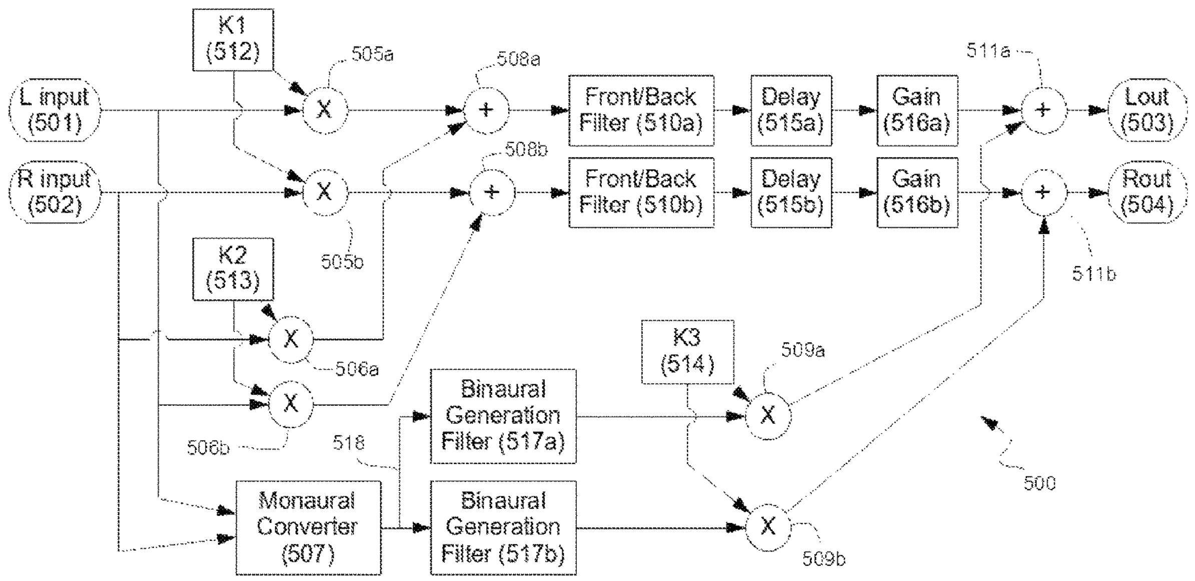
FIG. 5 is a block diagram of a sound source rotator of a sound sources rotator according to the present invention.

In the preferred embodiment of the present invention, sound sources rotator 108 keeps the left and right channels of all sound sources intact as much as possible. This helps to retain as many of input sound 101 original listening properties as possible, which is helpful for maximum fidelity, for example, when listening to music. FIG. 5 shows a block diagram of a preferred embodiment of a sound source rotator 500 to implement this idea. Left input signal L input 501 and right input signal R input 502 correspond to the left and right outputs of a sound source extractor 400. The output signals Lout 503 and Rout 504 consist of a weighted sum, combined in mixers 511*a* and 511*b*, of the following processed signals:

- The input L input 501 and R input 502 audio signals, optionally multiplied in gain blocks 505*a* and 505*b* by a factor of K1 512, and optionally passed through Front/Back Filters 510*a* and 510*b*, optionally also passing through delays 515*a* and 515*b*, and Gains 516*a* and 516*b*.
- The input L input 501 and R input 502 signals, but swapped (left channel to right channel and vice versa) and optionally multiplied in gain blocks 506*a* and 506*b* by a factor of K2 513 and optionally passed through Front/Back Filters 510*a* and 510*b*, and optionally passed through Front/Back Filters 510*a* and 510*b*, optionally also passing through delays 515*a* and 515*b*, and Gains 516*a* and 516*b*.
- The input L input 501 and R input 502 signals combined by Monaural Converter 507 into a monaural signal 518, which is then passed through left and right Binaural Generation Filters 517*a* and 517*b* and optionally multiplied in gain blocks 509*a* and 509*b* by factor K3 514.

The relative contributions of the above three processed signals are determined by factors K1 512, K2 513, and K3 514 and depend on several conditions:

1 if the angle phi is near zero, the left and right input signals L input 501 and R input 502 can be used without any substantial rotation, thus retaining much of the original sonic information. In this case, this would mean K1 512 is relatively large.

2 if the rotated angle for the sound, namely theta.i+phi is approximately equal to −theta.i, the left and right channel inputs L input 501 and R input 502 are similar to outputs Lout 503 and R out 504, but swapped. In this case, this would mean K2 513 is relatively large.

3 If the rotation angle phi 112 is near 180 degrees, the left and right channel outputs Lout 503 and Rout 504 are similar to L input 501 and R input 502, but reversed, and additionally moved from front to back or vice versa. In this case, this would mean K2 513 is relatively large.

4 If angle theta.i+phi is near 180 degrees—theta.i, Lout 503 and Rout 504 are similar to L input 501 and R input 502, but moved from front to back or vice versa. In this case, this would mean K1 512 is relatively large.

5 The less the extent to which one of the above cases is true, the more dissimilar Lout 503 and Rout 504 are, compared to L input 501 and R input 502, respectively. In this case, this would mean K3 514 is relatively large.

The values for factors K1 512, K2 513, and K3 514 can be found by several means. One is to compute the deviation in angle from the ideal cases expressed by each of the above rules, then weight the factors accordingly, such that closer agreement to the ideal case yields a higher value. Alternately, trigonometric weightings can be used, for example, by using the cosine of the angle between the actual effect of phi and theta.i as compared to the perfect match with one or more rules above and assuming zero for any negative cosine values. For example, in this embodiment, suppose theta.i is 15 degrees and phi is 20 degrees.

- By rule #1 above, K1 would then be cos(20 degrees) =0.94.
- By rule #2, cos(theta.i+phi−(−theta.i))=643 for K2.
- By rule 3, cosine(phi−180 degrees)=−0.939, so another estimate is K2=0.
- And by rule #4, cosine(theta.i+phi−(180 degrees−phi))=−0.643, so another estimate for K1=0.

A preferred embodiment of the present invention would then take the maximum values for K1 or K2, then distribute the difference between that value and 1.0 between K3 and the smaller of K1 and K2. In the example, this would approximately result in K1=0.94, K2=0.039, and K3=0.0215. Many other variations on the specific technique of computing the K1, K2, and K3 values so that they add up to a constant and are distributed toward the best matches having the greatest effect are possible within the scope of the invention. Ideally, a preferred embodiment will set a factor to 1.0 if there is a perfect match according to the above rules.

Front/Back filters 510*a* and 510*b* in the example shown in FIG. 5 optionally implement changes to the left and right signals input to them from mixers 508*a* and 508*b* to accentuate the change, if present, of the apparent source of sound from front to back or vice versa. In one embodiment of the invention, these filters are implemented via an optional inverse HRTF applied to the signal to cancel out effects due to the original direction of sound theta.i, then run through another HRTF that adds the sonic effects of the output angle of sound theta.i+phi. An alternate embodiment of the invention implements a simpler function, such as a slight high-frequency boost to move signals from the rear to the front, and a high-frequency cut to move from the front to the rear. For example, the boost could be by +/−2 dB effective above a frequency of 1000 Hz.

Delays 515*a* and 515*b* are present to make adjustments to the time of arrival of the Lout 503 and Rout 504 signals for cases where the theta.i+phi term is not extremely close or equal to the ideal cases cited above. Similarly, gain blocks 516*a* and 516*b* are provided to adjust the gains of the channels due to such differences. In an embodiment of the present invention, gain blocks 516*a* and 516*b* are simply multipliers. In a preferred embodiment of the invention, they are frequency-sensitive gain blocks, for example, frequency-sensitive filters known in the art, that modify the higher frequencies greater than the lower frequencies, to implement the differences in low-frequency and high-frequency perception as described above. To control delays 515*a* and 515*b* and gain blocks 516*a* and 516*b*, equations similar to equation 1 and equation 2 above, or the other alternative models for signal amplitude and delay, would be used to gently rotate the processed L input 501 and R input 502 signals as will be apparent to those of skill in the art. Optionally, Front/Back Filters 510*a* and 510*b* can additionally add a relatively large additional delay if theta.i+phi is from behind the user and theta.i is in front of the user, to accentuate the illusion of the sound coming from behind.

Optionally, Front/Back Filters 510*a* and 510*b* and/or Delays 515*a* and 515*b* and/or Gain Blocks 516*a* and 516*b* could be duplicated and repositioned in the design to follow both the K1 512 multipliers 505*a* and 505*b* and the K2 513 multipliers 506*a* and 506*b*, if it is desired to implement these functions separately for the K1 and K2 cases.

Monaural Converter 507 combines the two inputted channels of sound L input 501 and R input 502 from the Sound Source in question (that originated as the outputs of the source filters in the sound sources extractor) into a monaural signal 518. Binaural Generation Filters 517*a* and 517*b* then generate a spatialized multi-channel (e.g, binaural) version of the monaural signal 518 with an apparent angle of theta+phi. The simplest way to generate a monaural signal is to sum or average the two channels of sound. However, a preferred embodiment is to take into account the time delay between the two signals L input 501 and R input 502. Inverting the techniques described above, equation 2 can be used to decide which channel to delay and by how much. After applying this delay, the two signals are mixed by adding together. Instead of using equation 2, the HRTF approach can alternately be used by observing the time delay indicated by the HRTF impulse (or other) response for the angle theta.i, then applying that delay before averaging. A more sophisticated version would be to take an approximation to the inverse of the HRTF filter for theta, and apply it to each channel to remove effects of the ear anatomy on the sound qualities.

Binaural Generation Filters 517*a* and 517*b* generate a binaural or stereo output for left and right, respectively, at an apparent angle of phi+theta.i. To do so, several techniques are possible. The simplest embodiment is to once again use equations 1 and 2. Rearranging equation 1 provides the following expressions for the L and R channel output multiplicative factors to multiply outputs of Binaural Generation Filters 517*a* and 517*b* to get signals 509*a* and 509*b*:

$$\text{Right amplitude} = \tfrac{1}{2}K3\ \sin(phi+\text{theta}+pi/2) \quad \text{(equation 3)}$$

$$\text{Left amplitude} = \tfrac{1}{2}K3\ \cos(phi+\text{theta}+pi/2) \quad \text{(equation 4)}$$

Preferably, rather than a simple multiplication, these amplitudes are applied in a frequency-selective manner, for example, utilizing high-pass filtering as will be apparent to those with skill in the art, so that only the higher audio frequencies are substantially affected, for example, frequencies above 400 Hz. The monaural signal 518 is multiplied by the above-discussed gains to create the right and left outputs. In the preferred embodiment, the amplitude changes are followed with a time delay affecting left signal 509*a* using a mathematical head model such as:

$$\text{tdelay.left} = 2r\ \sin(phi+\text{theta})/v.\text{sound} \quad \text{(equation 5)}$$

If the tdelay.left is negative, then the same value of delay can be applied to the right channel tdelay.right instead. Optionally, for cases where the theta.i+phi corresponds to sound coming from behind, the time delay tdelay.left or tdelay.right can be increased to well beyond the calculated amounts, say by a factor up to 2 or 3, to provide a more convincing experience of the sound coming from behind. An optional embodiment of the invention therefore determines if the phi+theta angle from which the sound is coming is behind the listener (i.e., between 90 and 270 degrees relative to the reference listener head angle), and in such case, increases the time delay for this effect.

Alternately, an HRTF can again be used in Binaural Generation Filters 517*a* and 517*b*. This would be in the same sense that it is used in synthesizing surround sound in the art. The monaural signal 518 is convolved with the HRTF impulse response for a resulting apparent angle of theta+phi. The HRTF automatically takes care of the amplitude and time-delay issues. However, the HRTF is a bit more computation intense and often works better for some people who match its characteristics better than others.

An alternate embodiment of the present invention uses only the Monaural Converter 507 and its downstream components, rather than attempting to preserve the original two-channel content as achieved above with the K1 and K2 terms. The result would essentially be equivalent to setting K1 and K2 to be zero and using a constant K3.

Sound Combiner

Sound Combiner 109 takes the various rotated sounds from the bank of rotated signals from sound sources rotator 108 and combines them into a single two-channel (or however many channels are desired) output. In the preferred embodiment, a summation signal is used to accumulate the rotated sounds from the bank of rotated sounds. Various functions of the summation signal may be utilized in the present invention. The simplest version of sound combiner 109 simply adds the outputs from each of the path among the rotated sound signals 114 output by sound sources rotator 108 into the summation signal, and scales the resulting summation signal to be consistent with the listener's needs.

In a more complex embodiment of the present invention, sound combiner 109 takes into account the spectral qualities of adding together the rotated sound signals 114. In this case, the summation signal will not be a simple addition, but an addition of scaled versions of the various rotated sounds signals 114. If the source filters in sound sources extractor 106 are carefully selected to not overlap substantially in the frequency domain, and to have frequency responses that sum together for a flat overall frequency response, little needs to be done. However, if there is significant overlap between the source filters in sound sources extractor 106, sound combiner 109 preferably will adjust the amplitudes of the individual rotated sound signals 114 accordingly to make a more even spectral response of the overall system. For example, in an embodiment, the frequency responses of all the source filters are added together to obtain the frequency response of the overall system, and an optimization process is used to reduce the contributions of some of the rotated sound signals 114 so as to provide a more-flat frequency response. This process preferably includes changing the relative contributions of each of the paths, for example, by multiplying the Lout 503 and Rout 504 values for each sound source rotator 500 by a coefficient, or it could optionally include changing the frequency-decay responses of the source filters, for example by adjusting the cutoff frequencies of low-pass filters that follow the comb filters. The optimization for flatter frequency response can use any known optimization procedure. A preferred embodiment is to use a gradient-descent procedure among the above variables (path contributions, cutoff frequencies), using a figure-of-merit for the overall frequency response of the summation of the frequency response of the source filters of sound sources extractor 106 corresponding to the rotated sound signals 114. The preferred figure of merit measures how flat (ideal) the response is, for example, by measuring the variance of the amplitude values of the spectrum compared to the mean frequency response across the spectrum. Preferably, this optimization occurs at design-time, and the results are used in the run-time listening software or hardware, but the optimization of modifications to the rotated sound signals 114 could optionally be run in real time on the listening hardware/software setup if desired, particularly if dynamically-changing source filters are used in sound sources extractor 106.

Sound Combiner 109 optionally adds bits of filtered Lin 104 and Rin 105 signal from the input sound 101 or bits of monaural combined Lin 104 and Rin 105 input sounds at frequencies where the sum of source filters leaves gaps in the frequency response of the summation of the frequency responses of the source filters in sound sources extractor 106. One special case of this is for low frequencies, such as, for example, below 100 Hz. Since these frequencies are not easy to distinguish by direction, the source filters in sound sources extractor 106 optionally could have fundamental frequencies higher than the cutoff frequency in question, and a low-pass filter with a cutoff near this frequency could be used in sound combiner 109 to add these relatively unprocessed, and hence, very low distortion stereo or binaural signals to the output.

Figure 7:
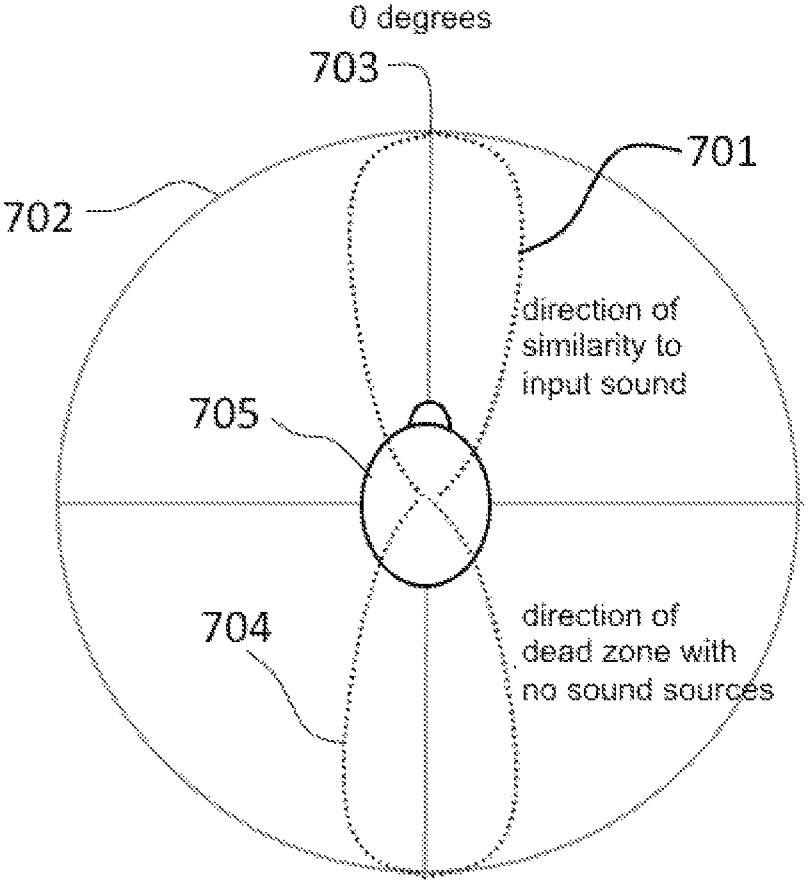
FIG. 7 depicts a function determining the degree of similarity that an output sound signal will have as compared to an input sound signal.

Sound Combiner 109 optionally takes into account that for phi=0 (no rotation required), the existing input sound 101 is already what is needed at outputs Lout 110 and Rout 111, regardless of rotation angle phi 112, because using the original input signals may result in less distortion than separating sound sources and recombining them through the filtering and rotating paths. Taking advantage of this, some or all of the output of Sound Combiner 109 can be the original input sound 101 under such conditions. So that there isn't a discontinuity in sound quality exactly at phi=0, this can be a weighted feature, where a cos(phi) or similar function is used to determine the fraction of the original input signal vs. the fraction of the reconstructed, combined signal. For example, in a preferred embodiment, lobe 701 in front of a user's head 705 in FIG. 7 indicates the relative contribution of the original sound in the output of the system, as a function of the angle indicated by circle 702 that represents the rotation angle phi 112, showing a reference listener head angle or zero degree reference 703. Rather than completely replace the output from sound sources rotator 108 when phi equals 0, a maximum fraction, for example 0.5 of the outputted amplitude, could preferably be mixed into the output of sound combiner 109 when rotation angle phi 112 is equal to zero.

A related issue arises in reverse if a "hemispheric" assumption is made in sound sources extractor 106, assuming that all sound sources originate in the 180 degrees that are toward the reference direction or reference listener head angle of the system. As a result if this assumption, if the user turns his or her head 705 away from the front, there will be somewhat of a "dead zone", wherein no sound appears to be coming from the rear. Lobe 704 depicts an example of the degree to which directions appear to have a dead zone from which less sound originates. The dead zone can cause a sense of unnaturalness about the silence from that direction, whereas in the real world, there is seldom such complete silence. It is therefore desirable to "fill in" some sound from the rear to make the auditory experience more interesting and natural if the above hemispheric assumption is made.

Figure 9:
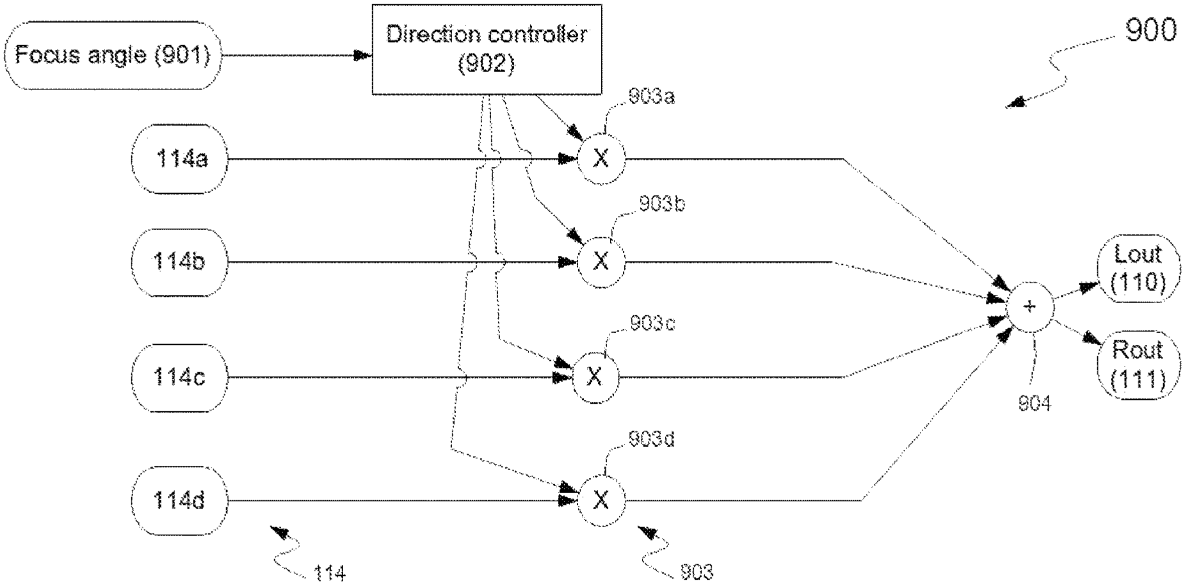
FIG. 9 depicts a Spatial Filtering Sound Combiner.

In another embodiment of the present invention, Sound combiner 109 implements a type of directional filter by modifying the amplitudes of rotated sound signals 114. The process is implemented in one example embodiment of the present invention as depicted in FIG. 9, which depicts a Spatial Filtering Sound Combiner 900 that varies the gains of the rotated sound signals 114 to create a desired spatial pattern. Given the rotated sound signals 114 and their corresponding angles computed as above, it will be apparent to those of skill in the art how to vary the amplitudes to obtain a desired spatial pattern or "beam shape". In FIG. 9, this is accomplished by the setting of multiplication coefficients by Direction controller 902, which causes multiplication of rotated sound signals 114 by multipliers 903, then combining the thus-weighed result in adder 904, which outputs the Lout 110 and Rout 111 signals as described above. As above, the signals 114 may correspond to multichannel signals, where the multiplications are done on each channel independently, etc.

Another embodiment of the present invention uses an equivalent mechanism as shown in FIG. 9 to variably modify sound signals 113 instead of rotated sound signals 114, which may have some advantages in simplifying the operation of Sound sources rotator 108, if used. A simplified embodiment of a Spatial Filtering sound combiner simply according to the present invention simply passes (equivalent to multiplying by 1.0 in one of the multipliers 903) only one or several of input rotated sound signals 114 while not passing the others (equivalent to multiplying those by 0.0). FIG. 9 also depicts an optional Focus angle 901 input that allows the Direction controller 902 to focus on a particular direction. In one embodiment, for example, when Focus angle 901 is set to D degrees, Direction controller 902 will give the largest-magnitude coefficient to the Rotated Sound source signal 114 that corresponds to D degrees.

This process of shaping the spatial sensitivity to the input sounds enables a listener or other recipient of the output sound such as Lout 110 and Rout 111 to listen to the sound sources corresponding to one or several directions in space. In yet another embodiment of the present invention, Sound sources rotator 108 performs a zero-degree rotation (or equivalently, is omitted). In another embodiment, angle comparer 107 is omitted. In a real-time use of the present invention, this implies that the invention performs its processing relative to the direction the user's head or body is facing, assuming that microphones providing the Lin 104 and Rin 105 signals are attached to the head or body, respectively.

Figure 10:
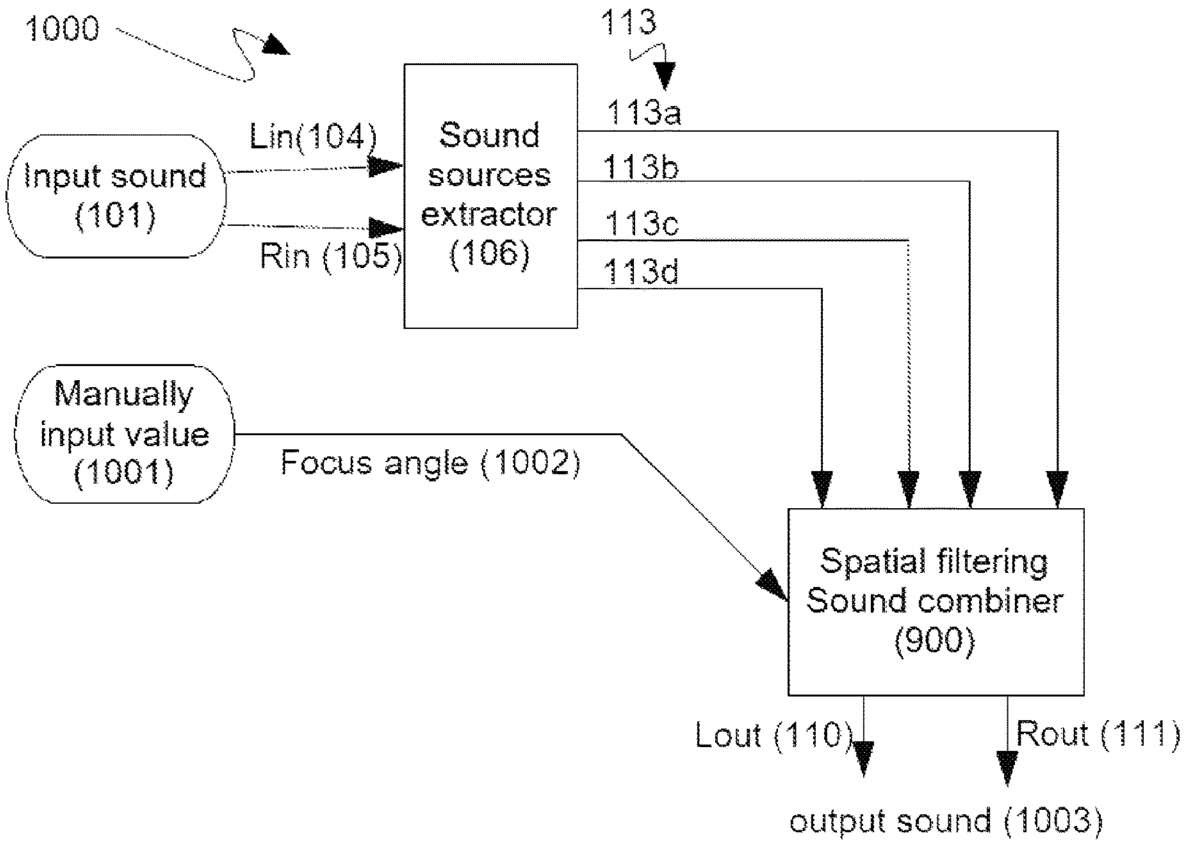
FIG. 10 depicts an example of the invention with a manually input angle value to allow listening to sounds from desired directions.

FIG. 10 depicts an example of an embodiment of a controllable angle listening device 1000, which uses a manually input value 1001 for focus angle 1002, which for example, corresponds to Focus angle 901 in the above FIG. 9 example embodiment of the present invention. Input sound 101 could come for example from a pair of microphones mounted on or near the ears or torso of the user. As described above, this embodiment uses a rotation angle phi of zero degrees, or equivalently, omits having a Sound sources rotator 108 and uses, for input to Spatial filtering Sound combiner 900, sound sources 113 as equivalent to zero-rotated version of rotated sound signals 114. For example, if the manually input value 1001 is zero, the invention would be accentuating the sounds coming from zero degrees. If, for example, the user wished to focus on sounds originating from 20 degrees to the left, this angle would be input as manually input value 1001, for example from a tap input or a small dial on the hardware or on a companion app, as will be apparent to those of skill in the art.

Applications for such embodiments include listening devices such as hearing aids, where it may be desirable to focus on only one direction of sound, treating the sound sources corresponding to other directions as noise. For example, Manually input value 1001 would enable a hearing aid user to listen to sounds not originating from straight ahead, without turning the microphones. Output sound 1003 goes to the earphone elements in a hearing aid, for example, in one such embodiment.

Angle Comparer

Angle comparer 107 determines the rotation angle phi 112 that should be applied to input sound 101 by sound sources rotator 108. If the original recording or music stream is made by a fixed microphone system, such as a synthetic head with embedded binaural microphones, the initial input head angle alpha 102 in FIG. 1 can be assumed equal to zero or another constant of interest throughout playback. In that case, the only changeable input will be the listener head angle beta 103. Initializing listener head angle beta 103, in other words, or equivalently, setting the value of the reference listener head angle, can proceed in various ways. A simple way, assuming the real-world orientation of the user is not important, would be to set listener head angle beta 103 and input head angle alpha 102 to zero at the beginning of a playback or streaming session. Then the initial impression will be of the user's head being aligned with the recording head. However, if the absolute angle is actually important, such as sounds being played back in an augmented-reality situation where sounds should come from particular directions in the real world, the absolute angle of the head should determine the initial value of listener head angle beta 103. Likewise, in that case, the absolute angle of the recording microphones with respect to the real world may be used as input head angle alpha 102. As the user moves his or her head, a sensor known in the art can obtain the head angle and compute the rotation angle phi 112 accordingly. For example, if the user's head is rotated through an angle delta beta, the corresponding change to rotation angle phi 112 will be the negative of delta beta. (in other words, if the head is rotated by some angle, the sound sources in the virtual environment must be rotated by minus that angle to maintain the same apparent direction.)

In a case where the recording microphones are not in a fixed orientation, the input head angle alpha 102 may also vary during a recording or streaming, and thus, the rotation angle phi 112 will also be modified as a function of input head angle alpha 102. In this case, the input head angle alpha 102 should be measured, for example, with a person having a recording device while engaging in an outdoor activity. If he or she turns the head while recording, the angle input head angle alpha 102 will change, and thus the rotation angle phi 112 will also be changed to keep the apparent orientation of the sound sources consistent for the listener. So in that case, sound sources rotator 108 will busily be rotating sounds to different angles even if the listener is not moving his or her head.

For some for example portable applications, it may be desirable for the sound to tend to be oriented with a direction aligned with the user's head position, rather from a direction fixed in space. For example, if the user is riding in a bus and the bus goes around a corner, it may be desirable if the user does not have to rotate her head by 90 degrees, long-term, to get the "normal" sound source orientations. Angle comparer 107 can accomplish this by using a high-pass kind of filter or decay filter that slowly returns the rotation angle phi 112 to zero over time, for example, returning most of the way to zero in 20 seconds when the user's head has not turned farther, so that the sound will tend to align itself in that way. In effect, this is equivalent to slowly biasing the reference listener head angle toward the current listener head angle beta 103. Alternately a software or hardware control button could be added to instantly or gradually reset the alignment between the user and the reference listener head angle. Alternately, a body-referenced reference listener head angle could be implemented by independently measuring the orientation of another part of the user's body, such as the torso, or by measuring the orientation of a vehicle or seating mechanism and utilizing that measurement in the calculations of angle comparer 107, as well be apparent to those with skill in the art. Any of the above would preferably be options settable in hardware or software control inputs for the invention.

Figure 8:
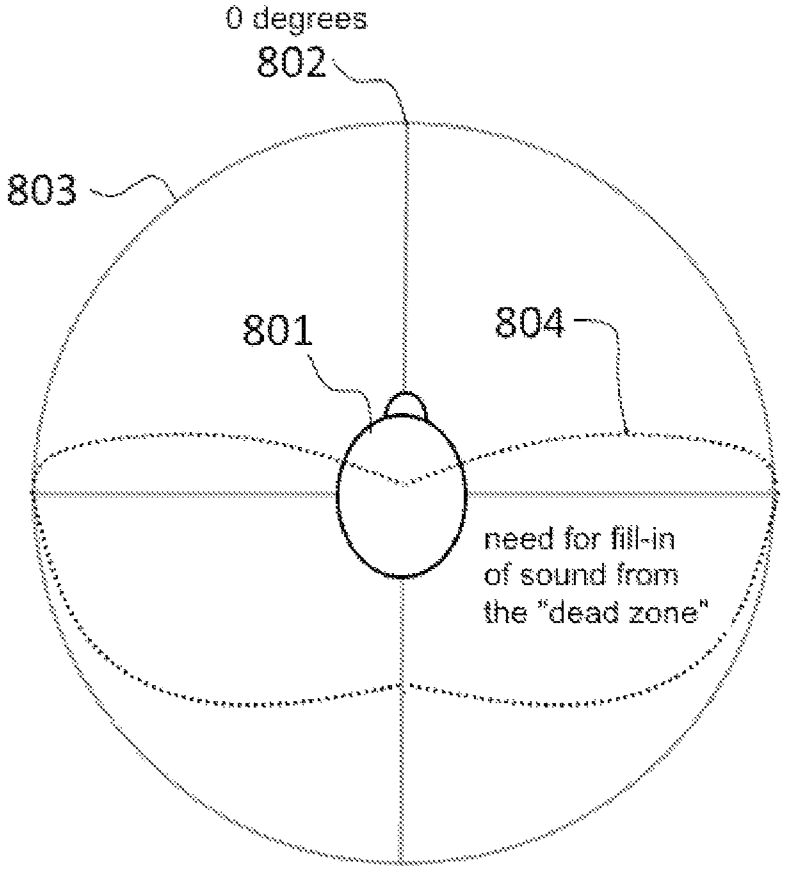
FIG. 8 depicts a function showing a dead zone in apparent signal arrivals.

FIG. 8 shows a depiction of the relative importance of this "fill-in" effect as a function of the listener's head rotation angle. When the listener's head 801 is facing the front, for example, the zero degree reference point 802 on reference circle 803, the original two-channel input sound already has components of any rear-arriving sound, even if this is not explicitly detected by the invention, so at this angle, the rear silence is not typically an issue, so plot 804 is at or near zero. Also, when the listener's head 801 facing 180 degrees from reference point 802, the balance between left and right sound levels is more similar, though reversed, from the forward facing, so there is less of a psychological effect resembling silence. The most evident issue occurs when the listener's head 801 facing toward the + or −90 degree points on circle 803, since there is more of a profound imbalance between right and left energy if sound sources extractor 106 is assuming sound coming from the front. Alternately, an embodiment of the present invention could choose a different plot instead of plot 804 instead of FIG. 8 in which the maximum is at 180 degrees, or an alternative to plot 804 could remain at or near its maximum value between 90 and −90 degrees of circle 803 through the 180 degree hemisphere, if desired. In the preferred embodiment, a function similar to plot 804 for the desired importance of fill-in is used to control the amplitude of a fill-in signal. The source of the fill-in signal can be one of several things. An embodiment is to gather all extracted sound sources that are near theta=0 into a "fill-in" sound source that is configured to make sound appear to come from the 180 degrees point on reference circle 803. This is preferably implemented by multiplying each sound source output by a front-weighting function such as plot 701 in FIG. 7, then summing the resulting products to create the fill-in source signal. Another embodiment is to create a monaural version of the original input sound 101, since it is already relative to a 0 degrees direction, then using this monaural signal as the fill-in sound source. In the preferred embodiment, the fill-in signal is provided so as to appear to be coming from the most "silent" direction of 180 degrees, also including a time delay and/or with some applied reverb or frequency compensation (e.g., lowpass filtering) to account for any desired reverb characteristics, such that the perceived effect is that sound from the front is reverberating and reflecting back from the rear. Due to the application of the "need for fill-in" function such as shown in plot 804, it should be reiterated that this reverb will not be present and thus will not change the qualities of the listener's experience except to fill in during those situations where the unnaturalness of the rear silence would be present. The overall amplitude of the fill-in is preferably scaled by a desired constant, which could depend on the type of material (music vs. conversation, etc.). For example, a value of 0.25 for this constant is used in an embodiment of the present invention, in other words, the fill-in is at most one-fourth as strong as the signals being used to create it. This is preferable to make the synthesized reverb or echo to be less strong than the front-arriving sound from which it is derived.

Not Only Yaw Angle

The above discussion is for the case where the system considers rotations only in the yaw angle (in other words, input head angle alpha 102, listener head angle beta 103 and rotation angle phi 112 are all for rotations within the horizontal plane). The present invention can also be used for pitch (up/down angle) and roll (tilting the head to the side), using essentially the same concepts as disclosed above. One extension is an embodiment using and extending the simple head model of FIG. 3 and equations 1 through 5. Instead of considering the input head angle alpha 102, listener head angle beta 103, rotation angle phi 112, and the theta.i associated with each of the sound source signals 113 as representing only the respective yaw angles, the equations and techniques disclosed above would be extended by basic trigonmetric techniques known in the art to include roll and/or pitch, preferably by representing each of the above angles as a multi-dimensional vector of two or three angles for roll, pitch and/or yaw. The modifications in such an embodiment will adjust the time delays, amplitudes, and/or applications of HRTF models correspondingly. Much of the information about the up/down apparent direction of sound is encoded in sound effects caused by the pinna, the outer, visible part of the ear, as the sound traverses it from various directions. For this reason, the use of the HRTF concepts in generating the sound, by also including the pitch variations of the HRTF, is preferred. Similar to the technique described above, the HRTF frequency responses can alternately be examined to adjust the frequency response of the various filters and gain blocks within sound sources rotator 108 without an actual HRTF available. Because it is very difficult to extract the roll and pitch in sound sources extractor 106, the preferred embodiment of the invention assumes roll and pitch of the input head or microphone input to be constant, e.g., 0 degrees, and to apply roll and/or pitch only to represent the listener's head in sound sources rotator 108 by these techniques. In other words, in this embodiment, input sound 101 is assumed to be arriving with fixed roll and pitch, but it nevertheless can be rotated in roll and/or pitch in sound sources rotator 108 as the user changes the roll and/or pitch if his or her head.

Not Only Recordings

The above discussion assumes that the present invention is being used for playing back recordings. However, the essence of the present invention also applies to live-streaming of sounds. Since the present invention works with any multi-channel sound source, and doesn't need to pre-process the entire event, it can receive a real-time or slightly-delayed stream of sound data from the sound source, along with optional alpha updates, and perform the functions as described above.

More than Two Channels.

If more than two channels of audio are available from the sound source, the invention can be modified to accommodate. sound sources extractor 106 in this embodiment is optionally run on all pairs of sound sources to obtain redundant theta.i values for each path. In addition to reducing errors, this would conceivably also eliminate the ambiguity issue discussed relative to FIG. 3 about whether the sound direction is in front of or behind the user's position in the virtual environment, discussed above, because each pair of signals from input sound 101 would give two possible angles and if the positions of the microphones upstream from input sound 101 are not all co-linear, there will be disambiguating information in the head angle calculations, for example, via equation 1 and equation 2. Sound combiner 109 in a preferred embodiment for three or more channels would preferably be similar to FIG. 5, preferably selecting the pair of channels in each sound source rotator 500 that allows for the least modification of the input audio signals L input 501 and R input 502, as determined by the matching rules enumerated above. In an alternate embodiment, if the microphones corresponding to the L input 501 and R input 502 sounds are facing in different directions, the two microphones most directly facing the corresponding sound source are utilized in sound source rotator 500. In another alternate embodiment, all channels or several channels are combined according to FIG. 5, and handled in a pair-wise basis by straightforward application of the rule-combination algorithms discussed above.

Figure 6:
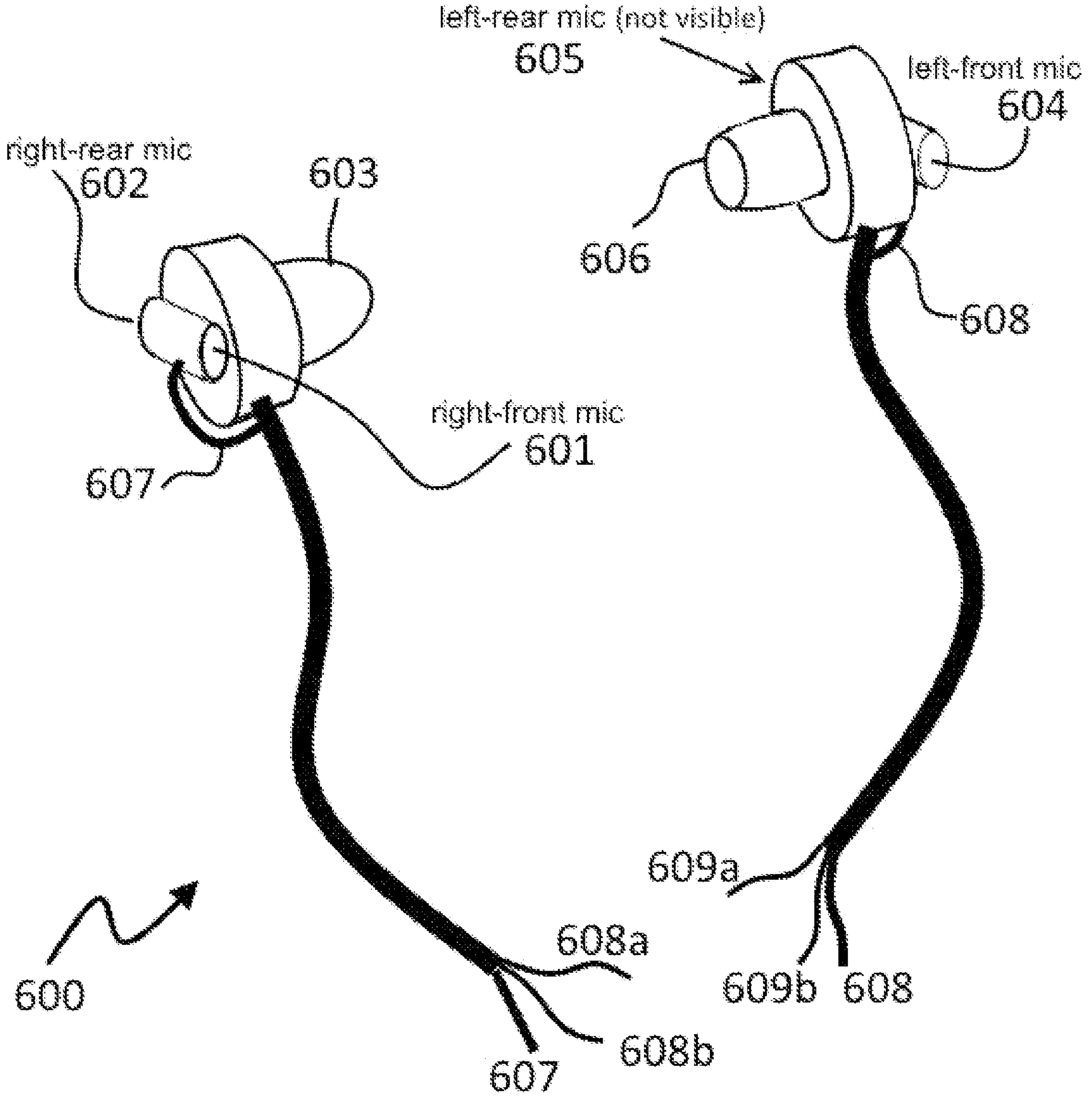
FIG. 6 is a drawing showing microphones integrated with a headset.

An optional embodiment of a recording device 600 that provides more than two channels for input sound 101 is shown in FIG. 6. Rather than a single microphone at each ear, this embodiment uses two microphones 601 and 602 at right earpiece 603 and two microphones 604 and 605 at left earpiece 606. Multiconductor cable 607 connects to the outputs of microphones 601 and 602. Multiconductor cable 608 connects to the outputs of microphones 604 and 605. Conductors **608*a* and 608*b* connect to earpiece 603 to provide sound to the listener's right ear, and conductors 609*a* and 609*b* connect to earpiece 606 to provide sound to the listener's left ear. Distinct sound qualities will be detected by microphones 601 and 604 as compared to 602 and 605 respectively, when the entire recording device 600 is rotated toward or away from a sound source in the environment, and the distinct sound qualities of both toward-facing and away-facing microphones will be available within the channels of input sound 101. Additionally, the differences in sound spectrum between microphones 601 and 602 and between microphones 604 and 605 are preferably used to disambiguate the direction of the sound source in sound sources extractor 106. When rotated in sound sources rotator 108, an embodiment of the present invention uses the channels of input sound 101** most closely facing each sound source. This concept is alternately applicable to a synthetic recording "head", with redundant ears facing both directions, or used with multiple real or synthetic heads facing in different directions.

Another embodiment of the present invention is used to combine multi-channel sound into two-channel sound. If more than two microphones are used in the creation of input sound 101, the sound can still be combined into a two-channel stream for compatibility with existing sound distribution and storage mechanisms. In a preferred embodiment, this is done by using a version of the architecture of sound rotation system 100 in FIG. 1 to produce a two-channel output by treating the rotation angle phi 112 to always be zero. Thus the input sound 101 signals are only combined, not rotated. Then at the listener's device, the same system 100 as described above is used, requiring only two channels in the input sound 101 in the listener's device. Alternately, even without using the invention for the listener, the embodiment that converts input sound 101 into two channels can be used to record stereo or binaural signals from more than two microphones.

Yet another embodiment of the invention is to use a third microphone on the cable from earbud, such as is currently used in the art for cellphone conversations. The input from this microphone is used in this embodiment, in effect to disambiguate the direction of the sound. Even if it is of lower quality than the in-ear microphones, the signal can be useful for sound sources extractor 106 for determining theta.i for each of the sound source signals 113, and potentially be ignored by sound sources rotator 108 since it is of lower quality. For example, if the microphone is located in front of the user's trunk, sound from the rear will be much more attenuated compared to sound from the front, and this difference can be used within the scope of the algorithms described above to decide whether to use the "facing toward the sound" or "facing away from the sound" angle in the sound source extractor.

Use without Headphones

An embodiment of the present invention is for use without headphones, for example with speaker output. An example of this embodiment is to include a sensor, e.g., infrared or video locating system, that detects where a listener is. Then, similar rotation effects can be used to rotate the apparent stereo direction toward that user. This could be used in gaming, for example, if a tennis ball is being hit, so that the sound of the ball is rotated to be the most realistic in apparent angle for the player that is receiving the ball. This embodiment of the present invention would also be useful for removing the effects of changes to input head angle alpha 102 for sound played back through speakers.

Listening Device

It can be very engaging to listen to the sound of standard stereo or binaural music or other events with the present invention, as a much more realistic, or alternately, interesting, effect is experienced, in that as the listener's head is rotated, the sound experience changes accordingly. To accommodate portability of the approach for use in portable electronics, such as cellphones and mp3 players and the like, a simple, non-obtrusive version of a head tracker to measure listener head angle beta 103 is desirable. One way to do this is shown in FIG. 6. A miniature single or multi-axis angular rate sensor and/or magnetometer is attached to the same enclosure as one or both of the earbuds or headset of the listener, and the signal sent to the portable electronics over the cable. This could be by modulating an inaudible carrier on the existing headphone audio conductor with the head-pointing information, or an additional conductor could be run down the line. Alternately, the built-in sensors in wearable electronics, particularly a head-worn device, could be used for this additional purpose. The sensors in a portable handheld device could also be utilized, but would not correspond as favorably to the actual head position of the user.

An alternate head tracker for a listening device can be made using the camera in the portable device. If the user's head is in view of one of the cameras, a video-based head tracker similar to, for example, the ViVo Mouse (http://www.vortant.com/vivo-mouse/) can be used to monitor the head pointing relative to the device. Then preferably, the device can measure its own orientation with respect to the external world by using its accelerometer, compass, and rate sensor. This would avoid the need for special head-tracking hardware, but has the disadvantage that the camera would have to be kept roughly pointed in a correct direction to detect the listener's head.

This specification represents the preferred embodiment of the invention. The concepts of the present invention are not necessarily divided into the modules here, such as sound sources extractor, sound sources rotator, sound combiner, and angle comparer, but could be divided into different sections, performed in somewhat different orders, etc. There are many alternate embodiments, such as alternate equations and filtering technique refinements that fall within the scope of the invention that will be apparent to those with skill in the art, once the principles of the invention are understood.

While there has been illustrated and described what is at present considered to be the preferred embodiment of the subject invention, it will be understood by those skilled in the art that various changes and modifications may be made and equivalents may be substituted for elements thereof without departing from the true scope of the invention.

The invention claimed is:

1. A system for processing binaural audio in portable situations comprising:

a plurality of microphones configured to output a multiple-channel input sound signal, further configured to receive an input head angle signal corresponding to orientation of the plurality of microphones;

a processing device comprising a memory device, the memory device storing program code that when executed by the processing device, causes the processing device to perform operations;

wherein the processing device is configured to receive the multiple-channel input sound signal and the input head angle signal;

and wherein the program code comprises a Source Filter program code, a second Source Filter program code, an Angle Calculator program code, and a Sound Rotator program code;

wherein the Source Filter program code is configured to receive the multiple-channel input sound signal and to output a multiple-channel sound source signal;

and wherein the second Source Filter program code is configured to receive the multiple-channel input sound signal and to output a second multiple-channel sound source signal;

and wherein the Source Filter program code comprises a filter program code configured to have a frequency response comprising a plurality of local maxima occurring substantially periodically as a function of frequency, and wherein the Source Filter program code is associated with a fundamental frequency;

and wherein the second Source Filter program code comprises a second filter program code configured to have a second frequency response comprising a second plurality of local maxima occurring substantially periodically as a function of frequency, and wherein the second Source Filter program code is associated with a second fundamental frequency;

and wherein the Angle Calculator program code is configured to calculate an apparent direction of the multiple-channel sound source signal and to output a calculated apparent direction signal;

and wherein the Sound Rotator program code is configured to receive the multiple-channel sound source signal source signal and the calculated apparent direction signal, and to output a rotated sound signal comprising a plurality of rotated output sound signal channels, wherein the Sound Source Rotator program code is configured to produce the rotated sound signal on the basis of producing an amplitude factor and/or a time delay and/or a transfer function based on calculating an output angle signal configured to change in opposition to changes in the apparent direction signal;

whereby the system produces the rotated sound signal in response to changes of orientation of the plurality of microphones.

2. The system of claim 1, wherein the plurality of microphones is mounted to a simulated or real head, and wherein the input head angle signal is configured to correspond to the yaw angle of the head.

3. The system of claim 2, wherein the plurality of microphones is affixed to a headphone or headset.

4. The system of claim 1, wherein the Sound Source Rotator program code is configured to output the rotated sound signal by modifying the relative amplitude and/or the relative time delay of a first channel of the multiple-channel sound source signal with respect to a second channel of the multiple-channel sound source signal.

5. The system of claim 1, wherein the Sound Source Rotator program code comprises a Head-related Transfer Function program code configured to output the rotated sound signal.

6. The system of claim 1, wherein the Source Filter program code comprises a comb filter program code.

7. The system of claim 6, wherein the Source Filter program code further comprises a low pass filter program code.

8. The system of claim 1, wherein the Angle Calculator program code is configured to produce the apparent direction signal based on a time delay signal, the time delay signal based on a comparison of time differences of multiple channels of the multiple-channel sound source signal.

9. The system of claim 1, wherein the Angle Calculator program code is configured to produce the apparent direction signal based on a relative-amplitude signal, the relative-amplitude signal based on a comparison of amplitude levels of multiple channels of the multiple-channel sound source signal.

10. The system of claim 1, further comprising a recording device configured to store the rotated sound signal, whereby the system can produce recordings that correspond to changes in orientation of the plurality of microphones.

11. A method for processing binaural audio in portable situations comprising:

configuring a plurality of microphones to output a multiple-channel input sound signal;

providing an input head angle signal corresponding to orientation of the plurality of microphones;

performing a Source Filtering comprising receiving the multiple-channel input sound signal and outputting a multiple-channel sound source signal;

performing a second Source Filtering comprising receiving the multiple-channel input sound signal and outputting a second multiple-channel sound source signal;

performing an Angle Calculation comprising calculating an apparent direction of the multiple-channel sound source signal and producing an apparent direction signal;

and performing a Sound Source Rotation comprising receiving the multiple-channel sound source signal source signal and the apparent direction signal, and outputting a rotated sound signal comprising a plurality of rotated sound signal channels, by producing the rotated sound signal on the basis of producing an amplitude factor and/or a time delay and/or a transfer function, and based on calculating an output angle signal configured to change in opposition to changes in the apparent direction signal;

wherein the performing a Source Filtering comprises providing a filter configured to have a frequency response comprising a plurality of local maxima occurring substantially periodically as a function of frequency, further comprising configuring the filter to be associated with a fundamental frequency;

and wherein the performing a second Source Filtering comprises providing a second filter configured to have a second frequency response comprising a second plurality of local maxima occurring substantially periodically as a function of frequency, further comprising configuring the second filter to be associated with a second fundamental frequency;

whereby the rotated sound signal can be produced in response to changes of orientation of the plurality of microphones.

12. The method of claim 11, wherein the configuring a plurality of microphones comprises mounting the plurality of microphones to a simulated or real head, and wherein the providing an input head angle signal comprises producing a signal corresponding to the yaw angle of the head.

13. The method of claim 12, wherein the configuring a plurality of microphones further comprises affixing the plurality of microphones to a headphone or headset.

14. The method of claim 11, wherein the performing a Sound Source Rotation comprises outputting the rotated sound signal by modifying relative amplitude and/or relative time delay of a first channel of the multiple-channel sound source signal with respect to a second channel of the multiple-channel sound source signal.

15. The method of claim 11, wherein the performing a Sound Source Rotation comprises applying a Head-related Transfer Function to output the rotated multiple-channel signal.

16. The method of claim 11, wherein the providing a filter comprises providing a comb filter.

17. The method of claim 16, wherein the providing a filter further comprises providing a low pass filter.

18. The method of claim 11, wherein the performing an Angle Calculation comprises producing the apparent direction signal based on producing a time delay signal, the producing a time delay signal based on comparing time differences of multiple channels of the multiple-channel sound source signal.

19. The method of claim 11, wherein the performing an Angle Calculation comprises producing the apparent direction signal based on producing a relative-amplitude signal, the producing a relative-amplitude signal based on comparing amplitude levels of multiple channels of the multiple-channel sound source signal.

20. The method of claim 11, further comprising providing a recording device and configuring the recording device to store the rotated sound signal, whereby the method can result in producing recordings on the basis of changes in orientation of the plurality of microphones.

* * * * *